(12) United States Patent
Leonhardt

(10) Patent No.: US 11,151,814 B2
(45) Date of Patent: Oct. 19, 2021

(54) ANTI-THEFT PROTECTION FOR A VEHICLE

(71) Applicant: FORD GLOBAL TECHNOLOGIES, LLC, Dearborn, MI (US)

(72) Inventor: Marcus Leonhardt, Dueren (DE)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 16/022,076

(22) Filed: Jun. 28, 2018

(65) Prior Publication Data

US 2019/0012859 A1   Jan. 10, 2019

(30) Foreign Application Priority Data

Jul. 4, 2017   (DE) ...................... 10 2017 211 321.9

(51) Int. Cl.
  *B60R 25/24* (2013.01)
  *B60R 25/20* (2013.01)
  (Continued)

(52) U.S. Cl.
  CPC .......... *G07C 9/00309* (2013.01); *B60R 25/10* (2013.01); *B60R 25/24* (2013.01);
  (Continued)

(58) Field of Classification Search
  CPC ...... G07C 9/00309; G07C 2009/00507; G07C 2009/00555; G07C 2009/00769;
  (Continued)

(56) References Cited

U.S. PATENT DOCUMENTS

2007/0200688 A1   8/2007   Tang et al.
2014/0067161 A1   3/2014   Conner et al.
(Continued)

FOREIGN PATENT DOCUMENTS

DE   202016102327 U1   5/2016
DE   102016014538 A1   6/2017
(Continued)

OTHER PUBLICATIONS

English Translation: Germaneers GmbH, DE 202016102327 U1, May 2016, German Patent Publication, original publication in the IDS dated Jul. 12, 2018 (Year: 2016).*
(Continued)

*Primary Examiner* — Nadeem Odeh
*Assistant Examiner* — Nicholas K Morgan
(74) *Attorney, Agent, or Firm* — Frank Lollo; Brooks Kushman P.C.

(57) ABSTRACT

A system and method for defeating a Relay Station Attack on a hands-free anti-theft system of a vehicle. The hands-free anti-theft system includes a vehicle-mounted transceiver which transmits an authentication request and a hands-free key transceiver paired therewith which receives the authentication request and responds thereto by transmitting a reply signal causing the vehicle to unlock and/or start. A detector is provided having a receiver operating on the frequency at which the authentication request is transmitted, and a memory in which a known characteristic of the authentication request signal is stored. The key transceiver and the detector are located beyond an activation range of the authentication request. When the detector receives a signal, it compares a characteristic of a received signal with the known characteristic, and triggers an alarm signal if there is a match.

10 Claims, 2 Drawing Sheets

(51) Int. Cl.
 B60R 25/31 (2013.01)
 G07C 9/00 (2020.01)
 G07C 9/21 (2020.01)
 B60R 25/10 (2013.01)
(52) U.S. Cl.
 CPC .............. G07C 2009/00507 (2013.01); G07C 2009/00555 (2013.01); G07C 2009/00769 (2013.01); G07C 2209/63 (2013.01)
(58) Field of Classification Search
 CPC ...... G07C 2209/63; G07C 2009/00412; G07C 2009/00539; B60R 25/10; B60R 25/24; B60R 25/245
 See application file for complete search history.

(56) References Cited

U.S. PATENT DOCUMENTS

| | | | |
|---|---|---|---|
| 2015/0109099 A1* | 4/2015 | Birkel | B60R 25/241 340/5.6 |
| 2016/0027226 A1 | 1/2016 | Gigl et al. | |
| 2016/0049033 A1* | 2/2016 | Sigal | B60R 25/24 340/5.61 |
| 2016/0234008 A1* | 8/2016 | Hekstra | G01S 13/751 |
| 2018/0178758 A1* | 6/2018 | Yamaguchi | H04M 1/00 |
| 2018/0315266 A1* | 11/2018 | Neuhoff | G07C 9/20 |
| 2019/0180542 A1* | 6/2019 | Geier | H04K 3/825 |
| 2019/0244457 A1* | 8/2019 | Brilion | B60R 25/24 |
| 2019/0256046 A1* | 8/2019 | Ohi | B60R 25/24 |
| 2019/0268169 A1* | 8/2019 | Castillo | H04L 9/0861 |

FOREIGN PATENT DOCUMENTS

| | | | |
|---|---|---|---|
| WO | 2012017214 A1 | 2/2012 | |
| WO | WO-2012017214 A1 * | 2/2012 | ............. B60R 25/24 |
| WO | 2015084852 A1 | 6/2015 | |

OTHER PUBLICATIONS

English Translation: Eder, DE 102016014538 A1, Jun. 2017, German Patent Publication, original publication in the IDS dated Jul. 12, 2018 (Year: 2017).*

* cited by examiner

ANTI-THEFT PROTECTION FOR A VEHICLE

CROSS-REFERENCE TO RELATED APPLICATIONS

This application claims foreign priority benefits under 35 U.S.C. § 119(a)-(d) to DE Application 10 2017 211 321.9 filed Jul. 4, 2017, which is hereby incorporated by reference in its entirety.

TECHNICAL FIELD

The present invention relates to hands-free vehicle anti-theft systems comprising a vehicle-mounted transceiver and a paired hands-free key transceiver which communicate wirelessly with one another to allow unlocking and/or starting of the vehicle when a person carrying the key is within an activation range of the vehicle. More specifically, the invention relates to a system and method for defending against a Relay Station Attack using a radio range extender on such an anti-theft system.

BACKGROUND

Systems already exist to protect or defend a vehicle having a hands-free (also commonly known as "keyless") anti-theft system against an attempted car theft using a radio range extender. This type of car theft is also referred to as a Relay Station Attack. In a Relay Station Attack, a legitimate authentication request signal emitted by a base station transceiver (the vehicle-mounted portion of the hands-free anti-theft system) is received with the radio range extender and retransmitted in an amplified form. This fraudulent amplified authentication request is received by the vehicle key (which is paired with the base station transceiver), which otherwise would be beyond the effective activation range of the un-amplified authentication request signal. Due to the amplified authentication request signal received by the key being identical to the known, genuine authentication request associated with the vehicle anti-theft system, the key transceiver emits a reply signal to the base station transceiver, which triggers a process to open and/or even start the vehicle.

Anti-theft systems and/or devices are disclosed in US 2014/0067161 A1, US 2016/0027226 A1, and WO 2015/084852.

The known protection systems have the disadvantage that either in addition to relatively simple components, such as a transmitter and a receiver, they also require other electronic components of a different type, such as a GPS system or an accelerometer, or else the base station must be equipped with additional hardware, such as two additional antennas.

SUMMARY

It should be noted that the features listed individually in the claims can be combined with each other in any technically appropriate way and specify additional embodiments of the invention. The description additionally characterizes and specifies the invention, in particular in relation to the Figures.

A system to provide protection against a Relay Station Attack comprises: a vehicle-mounted transceiver having a vehicle transmitter and a vehicle receiver; a hands-free key comprising a key transceiver paired with the vehicle-mounted transceiver and having a key transmitter and a key receiver; and a detector with a receiver operative to receive radio frequency (RF) signals at the same frequency as the authentication request transmitted by the vehicle-mounted transceiver. Both the detector and the key are located beyond an activation range of the original, un-amplified authentication request (this activation range establishing how close a key carried by a vehicle operator must be to the vehicle in order to unlock and/or start the vehicle), and the detector triggers an alarm signal to alert a vehicle owner/operator if it determines that a received signal has one or more characteristic matching that/those of the authentication request.

Advantageously the detector assumes an activated state when located outside a normal activation range of the authentication request. The activation range is that distance from the vehicle-mounted transceiver at which an authentication request is of sufficient strength to be detected and identified by the key transceiver, and alternatively assumes a deactivated state when the detector receiver is located within the activation range. In the activated state, the detector is set to an alert state and can trigger an alarm if the detector detects the fraudulent signal. In a preferred alternative design, the detector can be activated manually.

The detector comprises a microcontroller having a memory in which is stored at least one known characteristic of an authentication request corresponding to the vehicle with which the detector is associated. The detector determines that a received signal is fraudulent if that received signal has a characteristic which matches the known/stored characteristic.

The detector may determine that a received signal is fraudulent on the basis of the frequency at which it is transmitted matching that of the known authentication request of the vehicle with which it (and the hands-free key) is associated/paired, or on the basis of the received signal containing or including an information element that matches that of the known/stored information element which is associated with an identification feature of the vehicle with which the detector and key are associated/paired.

The information element which correlates with an identification feature of the vehicle that can be emitted by the vehicle transmitter, refers to the fact that the identification feature can be rendered readable by means of the information element. For example, the identification feature can be encrypted in the form of the information element. Since the fraudulent signal retransmitted by the amplifier is simply an amplified authentication request, that fraudulent signal will contain an information element identical to that of a legitimate authentication request.

In a modified alternative design, the information element is different from the second information element, for example based on a different coding procedure. The identification feature can be a vehicle identification number of the vehicle. It is also possible for the identification feature to be generated from the vehicle identification number and an item of personal data of an owner of the vehicle, such as a numerical PIN code or a password.

The activation range of the authentication signal ["vehicle-to-key signal"] is intended to mean that the range depends on both a transmission power of the vehicle-mounted transmitter and on a sensitivity of the key receiver. Therefore, the activation range of the "vehicle-to-key signal" may differ from the effective range of the "vehicle-to-detector signal."

The disclosed protection system has the advantage that, on the one hand, a complex design of the vehicle-mounted base station, for example with additional antennas, can be avoided and on the other hand, no other components are needed except the detector receiver, and in one advantageous design, the microcontroller. The detector receiver and the microcontroller are comparatively simple electronic components compared to a GPS system or an accelerometer. The detector can preferably be operated using the same protocols, signals and/or technical equipment as the vehicle key. The advantage of this is that, compared to an alternative design with a GPS system or an accelerometer, the complexity of the protection system is lower and therefore the proposed protection system is simpler in its design.

The detector receiver may be identical to the key receiver. An existing hands-free anti-theft system, consisting of the vehicle-mounted transceiver and a key transceiver paired therewith, can be upgraded to the disclosed protection system without the need to modify a hardware component of the vehicle base station or of the vehicle key.

It is even possible to upgrade the existing system to the proposed protection system without making any change to the software of the existing system. Due to the proposed protection system it is also no longer necessary to store the vehicle key in a shielded box (also known as a "faraday cage") in order to protect against a Relay Station Attack. The disclosed protection system can prevent the most common applications of the Relay Station Attack, in particular if the vehicle is parked near a residence of the owner/operator of the vehicle.

The disclosed system is effective when the detector is located (along with the key, as when it is carried away from the vehicle by the authorized vehicle operator) outside the activation range of the authentication request transmitted by the vehicle-mounted transceiver. As known in the prior art, the authentication request signal from the vehicle transmitter is normally in the low-frequency (LF) range, and is broadcast with limited power so as to have a relatively short activation (or maximum reception) range. If the detector is located in such a way, then any received LF signal, and which may include the identification element associated with the associated vehicle, is determined to be a fraudulent signal. The detector can be located, for example, in a house occupied by the authorized vehicle driver (key user). In another alternative design, the detector can effectively be located anywhere in the vicinity of a place where the driver is expected to carry or leave the key when not in use.

According to another feature of the system disclosed herein, the microcontroller may comprise a learning function, which enables the information element stored in the memory to be changed to that associated with a different vehicle. This can be affected in such a way that the detector is brought into the activation range of the authentication request, and set into a programming mode, such as by pushing a button on the detector. A signal emitted by the vehicle-mounted transceiver, which contains the identification element of the new vehicle, is received by the detector receiver and the identification element is stored in the detector memory. The programming mode is then exited.

Reference herein to the detector output triggering an alarm signal means, in a first disclosed embodiment, that the detector has a transmitter operative to wirelessly send a signal to the vehicle-mounted receiver of the base station, which results in an alarm signal being generated by a device or system onboard the vehicle. Then, the base station triggers an in-vehicle alarm device associated with the protection system and with which the base station is coupled. The alarm device can be a horn or a lamp, which is acoustically or visually perceptible by a person in the vicinity of the base station.

In another embodiment, the triggering of the alarm signal is to be understood mean that the detector itself generates the alarm signal perceptible by a person (audibly and/or visibly, for example) in the vicinity of the detector. Thus, the detector can trigger a tone generator of the detector, which generates an audible alarm tone or a flashing of a light in the detector.

In a third embodiment, the detector triggers the alarm signal by sending a wireless triggering signal to a mobile device which then produces or emits the alarm signal. The mobile device may be, for example, a mobile/cellular telephone, a tablet, or a laptop computer, which can be wirelessly connected to the detector or the base station. The triggering signal in this embodiment may advantageously be implemented as a digital signal, for example an email, a text message, etc., and may be transmitted over the Internet. The detector can in this case establish a connection to the Internet. This embodiment has the advantage that an existing system with the key, the vehicle-mounted base station and the mobile device can be upgraded to the proposed protection system. In this case the base station or the detector does not need a dedicated alarm system, which means cost savings can be made on components.

Additionally, in the above third embodiment wherein the mobile device is of a type that is commonly/habitually kept close at-hand (carried, for example) by the user, the alarm signal is likely to be easily perceptible for a user. In addition, this design does not require a loud alarm signal emitted by the vehicle, which means a disturbance of the peace in the area surrounding the vehicle can be avoided.

The disturbance of the peace can also be avoided if, in accordance with another design, the detector sends the alarm signal to the key transceiver and the key has an alarm device (which may for example be audible and/or visible) which is activated upon receiving the alarm signal.

In another disclosed feature, the detector receiver may be configured and operative to only receive signals with a frequency in the low-frequency band. In addition, but also independently of this, it is advantageous that the detector only detects fraudulent signals which are emitted with a frequency in the low-frequency band. The low-frequency band comprises frequencies between approximately 30-300 kHz. This design also preferably provides that the vehicle transmitter emits signals only in the low-frequency range.

Because a low-frequency transmitter can be designed more simply than a high-frequency or ultra-high frequency radio wave transmitter, the complexity of the protection system can be further reduced. Furthermore, when using communication in the low-frequency band the range of the vehicle transmitter for the detector receiver can be limited more easily and definitely than, for example, when using communication frequencies higher in the radio frequency. This activation range is advantageously limited to a distance in the region of about two meters. Thus, the protection system can be particularly advantageously used as protection against the theft of the vehicle.

In the embodiment in which the detector emits the alarm signal if the detector receives a signal having a frequency matching that of an authentication request (regardless of whether the received signal contains a vehicle-specific identification element), the protection system can be used for several parked vehicles in the vicinity of the detector. This may enable a cost reduction for a plurality of users of the protection system.

In a further embodiment, the protection system includes a second vehicle key incorporating the above-described features and functionality of a detector. Such a detector-key is equipped with a transceiver like the "normal" prior-art vehicle key described above, which receives in the LF band utilized by the vehicle-mounted transceiver. A "normal" vehicle key according to the prior art already comprises a transceiver paired/compatible with a vehicle-mounted transceiver, and may further comprise a microprocessor. Adapting a prior art vehicle key to function as the detector can therefore be accomplished by reprogramming the microprocessor of the detector-key to function as the detector. Therefore, components of the detector, such as the detector transceiver and, if the detector-key originally has a microcontroller, the microcontroller as well, can be saved.

Because the detector-key may be a spare or extra key that is utilized to operate the vehicle only infrequently, this feature of the disclosed system is very advantageous. The detector-key may also be equipped with software which provides the above-described learning function. This means that less effort is also required to deploy the protection system.

The detector-key can be easily be switched over from a first operating mode wherein it functions as a "normal" hands-free key (as is well-known in the prior art) to a second operating mode (using a control element, such as a button) wherein it functions as the detector.

In a further configuration the detector further comprises an interference transmitter which is activated by or along with the alarm signal. The interference transmitter when activated transmits an interference signal which interferes with a reply signal (intended to unlock and/or start the vehicle) transmitted by the key transceiver so that the reply signal is not effectively received by the vehicle-mounted transceiver. In this way it is possible to prevent the reply signal of the key transceiver from reaching the base station in a form or strength at which it will enable the opening or starting of the vehicle. This is advantageously in addition to the emission of the alarm signal, because a protective action is additionally carried out automatically.

It may further be provided that the protection system further comprises a vehicle component coupled with the base station, and the base station blocks the vehicle component as soon as the vehicle receiver receives the alarm signal. The vehicle component used can be a door lock or a drive element, such as a combustion engine or an electric motor. Thus, for example, the base station can be connected to a control unit of the vehicle and disable a starter of the drive element. In this alternative design it is also not necessary for the user to react immediately, because the protection system can automatically prevent a theft of the vehicle.

As described above, the proposed protection system can be deployed by means of a prior art hands-free anti-theft system consisting of the vehicle-mounted transceiver and the hands-free key paired therewith, with the addition of only the detector which functions as described herein. Independently of the previous designs of the protection system, a detector is therefore proposed in order to achieve the object.

A method for protecting a vehicle is also disclosed herein which uses the protection system according to any one of the previously described alternative designs. The method has the following steps: In a first step, a known characteristic of an authentication request transmitted by a vehicle-mounted transceiver is stored in a memory of a detector. In a second step, the detector and the key transceiver are positioned beyond an activation range of the authentication request. In a third step, a receiver of the detector is operated on a frequency of the authentication request to detect a signal. In a fourth step, the detector compares a characteristic of a received signal with the known characteristic and triggers an alarm signal if the characteristic matches the known characteristic.

The protection system can be used in such a way that the range of the vehicle transmitter for the detector receiver, designated in the following as the activation range, is known. The activation range may, in particular, be known for a specific location with a specific environment, which is defined by an arrangement of buildings, among other things. Depending on the weather and additional vehicles parked around the vehicle, it is possible that the activation range may be variable.

In a particular configuration of the method it can therefore be provided that after stopping an engine of the vehicle, a connection is set up between the vehicle transmitter and the key receiver and is maintained until such time as the key receiver moves outside the range of the vehicle transmitter for the key receiver, hereafter referred to as the contact range. While the connection between the vehicle transmitter and the key receiver exists, the key transmitter advantageously emits a contact flag signal with a value of one, which the detector receiver can receive in close proximity to the key transmitter.

If, for example, the detector and the first vehicle key are located on the body of the driver of the vehicle, then the detector receiver can receive the contact flag signal at all times. If the first vehicle key is moved away from the vehicle after the engine has been stopped, then the connection between the vehicle transmitter and the key receiver is broken as soon as the first vehicle key is moved outside of the contact range.

If a break in the connection is detected by means of a microprocessor of the first vehicle key, the key transmitter sends the contact flag signal with a value of zero to the detector receiver. The detector is advantageously designed in such a way that it switches to the activated state when the detector receiver detects a negative edge of the contact flag signal, i.e. a change in the value of the contact flag signal from one to zero. In this way it is possible to ensure that the detector is in the activated state, as soon as the first vehicle key is outside of the contact range. Furthermore, a user of the protection system does not need to know the activation range.

In an advantageous manner, the detector sends a signal by means of the detector receiver of the detector to the key receiver or to the mobile device, as soon as the detector enters the activated state. This allows the driver to tell if the detector is activated from the first vehicle key or from the mobile device.

Further features and advantages of the invention are obtained from the following description of exemplary embodiments of the invention, which are not to be interpreted restrictively, and which are explained in more detail below with reference to the drawings. The drawings show schematically:

DETAILED DESCRIPTION

Figure 1:
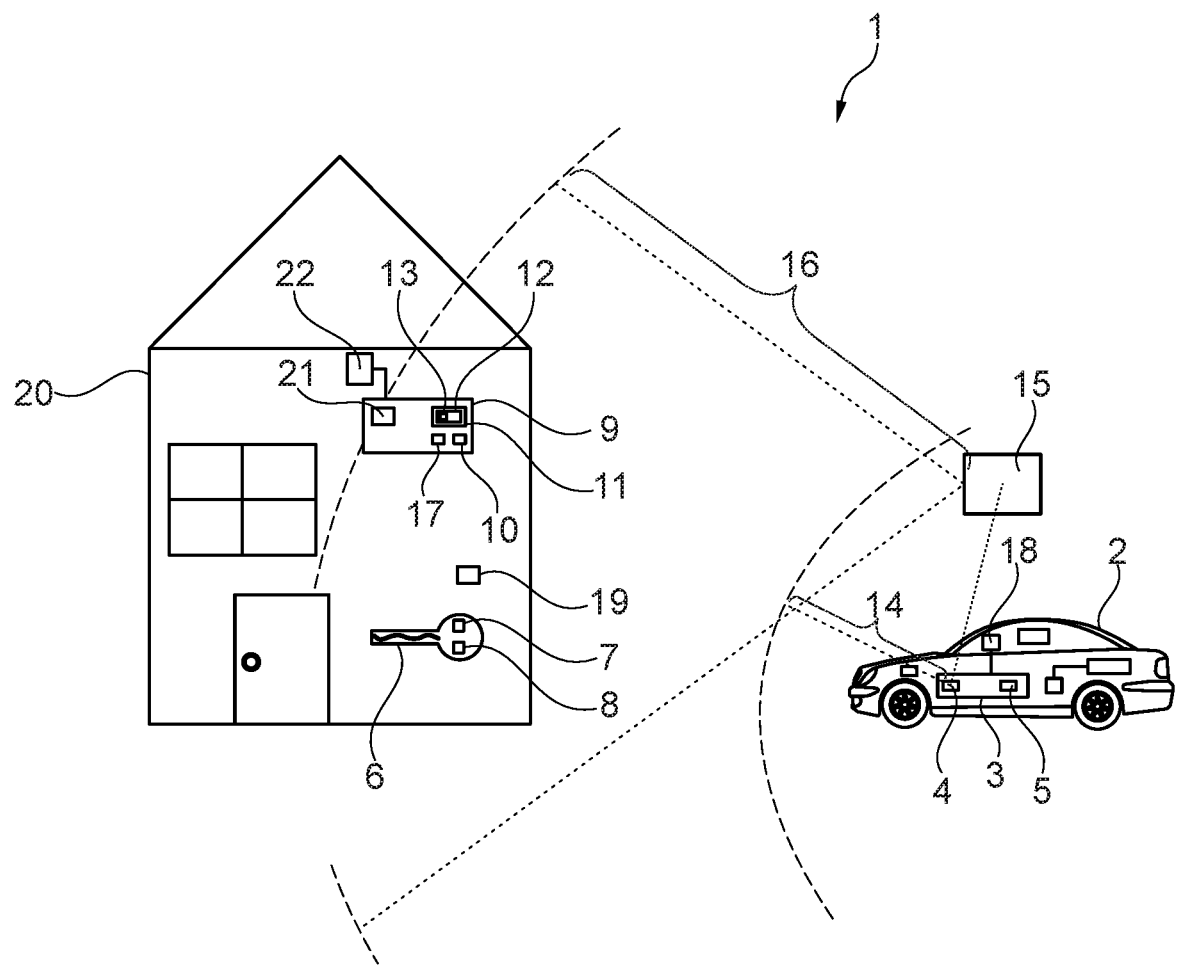
FIG. 1 is a first embodiment of a protection system for a vehicle equipped with a hands-free anti-theft system; wherein a detector is located in a building.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, parts that are equivalent in terms of their function are always labeled with the same reference numeral, so that these are generally described only once.

FIG. 1 shows a protection system 1 for a vehicle 2. The vehicle 2 is equipped with a hands-free anti-theft system of a type well-known in the prior art, comprising a vehicle-mounted base station 3 having a vehicle transmitter 4 and a vehicle receiver 5 (referred to together herein as a vehicle-mounted transceiver 4/5), and a hands-free key 6 paired with the vehicle mounted transceiver 4/5 and having a key transmitter 7 and a key receiver 8 (referred to together herein as a key transceiver 7/8).

During normal operation of the hands-free anti-theft system, as is well-known in the art, the vehicle-mounted transceiver 4/5 transmits an authentication request which is received by the key transceiver 7/8. Upon receipt of the authentication request, the key transceiver 7/8 responds by transmitting a reply signal that is received by the vehicle-mounted transceiver 4/5. If the reply is verified by the vehicle-mounted transceiver 4/5 as having been sent by a key that is paired with the base station 3, then appropriate vehicle systems are affected to allow unlocking and/or starting of the vehicle.

The protection system 1 further comprises a detector 9 comprising a detector receiver 10 and a microcontroller 11. In the depicted embodiment, both the hands-free key 6 and the detector 9 are located inside of a building 20 (for example the domicile or workplace of a vehicle operator) such as may be the case when the vehicle driver/operator has carried the key into the building after leaving the vehicle 2 parked outside.

The microcontroller 11 has a memory 12, in which at least one information element 13 is stored, the information element correlating with an identification feature of the vehicle 2 which the detector is operative to protect against theft. The information element 13 is identical to that which is transmitted by the vehicle-mounted transmitter 4 as part of the authentication request and may, for example, match the vehicle identification information of the vehicle. The detector 9 determines that a received signal is fraudulent if it has a characteristic matching the stored known signal characteristic. This determination may be assumed to be accurate any time at which the detector 9 is located a distance from the vehicle-mounted transceiver 4/5 that exceeds an activation range 14 of the authentication signal. The detector 9 triggers an alarm signal when the detector 9 detects the fraudulent signal.

The activation range 14 corresponding to the maximum effective reception range of the authentication signal as received by the key transceiver 7/8. Beyond the activation range 14, the authentication signal does not have sufficient strength to cause the key transceiver 7/8 to recognize it as coming from the vehicle with which the key 6 is paired, and therefore the key does not transmit a reply signal. FIG. 1 also shows how a signal emitted by the vehicle transceiver 4/5, which cannot reach either the hands-free key 6 or the detector 9, may be amplified by means of a radio range extender 15 employed by a potential car thief. The radio range extender 15 receives an authentication signal transmitted by the vehicle-mounted transceiver 4/5, amplifies that signal, and emits an amplified signal that, although identical (except in strength) to that transmitted by the vehicle-mounted transmitter 4, is a fraudulent signal. Due to the amplification provided by the radio range extender 15, the fraudulent signal has an increased maximum reception range 16 for the key transceiver 7/8.

The following describes how opening or starting the vehicle 2 with the radio range extender 15 can be prevented using the protection system 1. Because the detector 9 is located outside of the activation range 14 of the un-amplified signals emitted by the vehicle transmitter 4 (which is typically on the order of 2 meters in currently operational hands-free anti-theft systems of the type pertinent here), an authentication request transmitted by the vehicle transmitter 4 cannot be received by the detector receiver 10. If, however, after the signal emitted by the vehicle transmitter 4 is amplified by the radio range extender 15, the detector receiver 10 is able to receive the amplified, and therefore fraudulent, signal.

Theoretically, the microcontroller 11 can also receive any and all radio signals transmitted on its operating frequency. Therefore, by means of the microcontroller 11 the characteristics of and/or information contained in a signal received by the detector 9 is advantageously compared with the known characteristic contained in the memory 12. If the result of this comparison is that the characteristic of the signal received by the detector 9 matches the known characteristic of the authentication signal, then the received signal is identified as fraudulent.

When the detector 9 detects the fraudulent signal, the detector 9 triggers an alarm signal. In a first embodiment, the alarm signal is implemented in the form of a tone emitted by the detector. In a second embodiment, a trigger signal is sent by a detector transmitter 17 to the vehicle receiver 5 of the base station 3. When the vehicle receiver 5 receives the trigger signal, the base station 3 activates an alarm system 18 operatively coupled with the base station 3.

It is also possible that a triggering signal is sent by the detector transmitter 17 to a second alarm system 19 which may, for example, be located in a building 20, and may have a battery-powered tone generator. In the example shown in FIG. 1 the hands-free key 6 and the detector 9 are also located in the building 20.

In a particular design, the detector 9 has an interference transmitter 21. The interference transmitter 21 is preferably activated when the detector receiver 10 detects the fraudulent signal. When the interference transmitter 21 is activated, it transmits an interference signal at the same frequency as the reply signal emitted by the vehicle key 6. The interference signal interferes with the reply signal in such a way that the vehicle-mounted transceiver 4/5 is prevented from proper receiving and/or processing the reply signal emitted by the key 6. Thus, for example, a reply signal which is emitted by the vehicle key 6 and would, if received without interference, cause the vehicle 2 to open and/or to start, will no longer cause such effects.

The detector receiver 10 is preferably designed as a low-frequency (LF) receiver, which preferably receives signals with a frequency of approximately 125 kHz. The detector transmitter 17 may transmit signals in the range of 315 MHz and 433 MHz so that they may be received by a conventionally known vehicle-mounted transceiver.

In a particular design, the information element 13 stored in the detector memory 12 can be changed or "overwritten" to match that of the hands-free anti-theft system of any desired vehicle 2. If, for example, the vehicle 2 and the identification feature of the vehicle 2, such as a vehicle identification number, changes, then the information element 13 is modified in such a way that the identification feature of the new vehicle 2 can be obtained from the information element 13.

In an additional feature, it can be provided that the detector 9 is connected to an external energy supply 22. Also, in a particular embodiment the detector 9 may be able to emit a plurality of signals at different frequencies at the same time with the detector transmitter 17. So, on the one hand, the detector transmitter 17 can send the alarm triggering signal to the vehicle receiver 5 at a radio frequency. At the same time, the detector transmitter 17 can emit an interference signal which interferes with a reply signal of the first vehicle key 6.

In addition, it can be provided that the base station 3 ignores any signals which are emitted by the key transmitter 7 as soon as the vehicle-mounted receiver 5 has received the alarm triggering signal.

Figure 2:
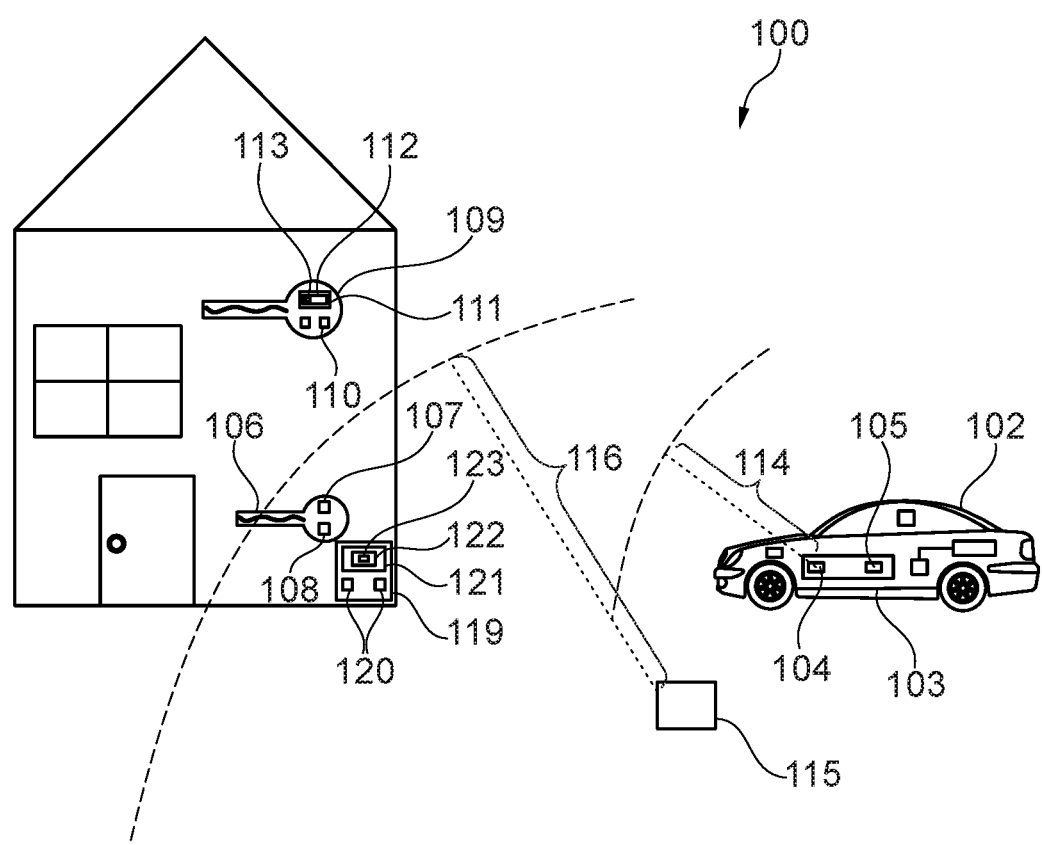
FIG. 2 is a first embodiment of a protection system for a vehicle, wherein a detector-key is used as a detector.

FIG. 2 shows a second protection system 100 for a vehicle 102 having a hands-free anti-theft system comprising (similar to the FIG. 1 embodiment) a vehicle-mounted base station 103 with a vehicle transceiver 104/105, and a first hands-free key 106 with a key transceiver 107/108 paired therewith. In the FIG. 2 embodiment, the functionality of the detector is embodied as or incorporated into a second hands-free key 109, or detector-key, having a detector receiver 110 and a microcontroller 111

The detector microcontroller 111 has a memory 112, in which at least one information element 113 is stored, which correlates with an identification feature of the vehicle 111 that is transmitted by the vehicle transmitter 104. On the basis of the stored information element 113 matching that of the received signal, the detector 109 detects a fraudulent signal. The detector 109 emits an alarm signal if the detector 109 detects the fraudulent signal.

Also shown in FIG. 2 is an activation range 114, which corresponds to the range at which an authentication request signal emitted by the vehicle transmitter 104 is receivable by the detector receiver 110 and by the key transceiver 107/108.

FIG. 2 also shows a specific design of the second protection system 100, with which a Relay Station Attack originating from a radio range extender 115 can be prevented. In this configuration the radio range extender 115 is located in such a way that while an amplified/fraudulent signal with an extended range 116 does reach the first hands-free key 106, it does not reach the detector 109. For this purpose, the second protection system 100 has an additional detector 119 with a fourth receiver 120. The additional detector 119 also has a microcontroller 121 with a memory 122, in which at least one information element 123 is stored, which correlates with an identification feature of the second vehicle 102 that is transmitted as part of the authentication request by the vehicle transmitter 104. The additional detector 119 can be designed in the same way as the detector 9 or 109 according to any one of the different embodiments of the detector 9 or 109 described above. The additional detector 119 is positioned at a distance from the detector-key 109, so that a safe area for storing the first vehicle key 106 is enlarged.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle anti-theft system comprising:
   a vehicle-mounted transceiver operative to transmit an authentication request having a known characteristic;
   a key transceiver paired with the vehicle-mounted transceiver to recognize the authentication request and transmit a reply recognized as valid by the vehicle-mounted transceiver, the key transceiver is further operative to transmit a contact flag signal indicating whether or not the key transceiver is receiving the authentication request; and
   a detector receiving transmissions on a frequency of the authentication request and receiving the contact flag signal and operative to trigger an alert when a received signal on the frequency of the authentication request has a characteristic matching the known characteristic and the contact flag signal indicates the key transceiver has stopped receiving the authentication request.

2. The system of claim 1, wherein the known characteristic of the authentication request is a vehicle identification element.

3. The system of claim 2, wherein the vehicle identification element is encrypted.

4. The system of claim 1, wherein the known characteristic of the authentication request is a transmission frequency thereof.

5. The system of claim 1, wherein the detector further comprises a transmitter and wherein triggering of the alert comprises sending a wireless signal to the vehicle-mounted transceiver, and the wireless signal causes an alarm signal to be emitted by a component of a vehicle.

6. The system of claim 1, wherein the detector further comprises a transmitter and wherein triggering of the alert comprises sending a wireless signal to the key transceiver, and the wireless signal causes an alarm signal to be emitted by the key transceiver.

7. The system of claim 1, wherein the detector further comprises an interference transmitter operative to transmit an interference signal on a frequency of the reply transmitted by the key transceiver in response to the authentication request.

8. The system of claim 1, wherein the detector further comprises a transmitter operable in a mode wherein the detector transmits a reply to the authentication request, the reply enabling at least one of an unlocking of and a starting of a vehicle.

9. A method for defeating a Relay Station Attack on a hands-free anti-theft system of a vehicle having a vehicle-mounted transceiver and a key transceiver paired therewith, comprising:
   storing in a memory of a detector a known characteristic of an authentication request transmitted on a frequency by the vehicle-mounted transceiver;
   positioning the detector and the key transceiver beyond an activation range of the authentication request;
   operating the key transceiver to transmit a contact flag signal on a frequency indicating whether or not the key transceiver is receiving the authentication request;
   operating a receiver of the detector on the frequency of the authentication request and on the frequency of the contact flag signal; and
   operating the detector to compare a characteristic of a received signal on the frequency of the authentication request with the known characteristic and to trigger an alarm signal when the characteristic matches the known characteristic and the contact flag signal indicates the key transceiver is not receiving the authentication request.

10. The method of claim 9 further comprising:
reprogramming a second key transceiver to perform the comparing and the triggering functions of the detector.

\* \* \* \* \*